United States Patent
Holloway

Patent Number: 5,819,775
Date of Patent: Oct. 13, 1998

[54] LOW FLOW RATE VALVE

[75] Inventor: David G. Holloway, Deerfield, N.H.

[73] Assignee: Parker & Harper Companies, Inc., Raymond, N.H.

[21] Appl. No.: 728,744

[22] Filed: Oct. 10, 1996

[51] Int. Cl.$^6$ ........................................................ E03B 1/00
[52] U.S. Cl. .............................. 137/1; 251/126; 138/43; 138/46
[58] Field of Search .............................. 251/126; 138/42, 138/43, 46; 137/1

[56] References Cited

U.S. PATENT DOCUMENTS

| | | | |
|---|---|---|---|
| 2,323,115 | 6/1943 | Bryant | 138/43 |
| 2,447,920 | 8/1948 | Terry | 251/126 |
| 2,833,311 | 5/1958 | Baldelli | 138/43 |
| 3,841,354 | 10/1974 | McDonnell | 251/126 |
| 3,907,249 | 9/1975 | Persson | 251/126 |
| 4,176,683 | 12/1979 | Leibinsohn | 251/126 |
| 4,506,423 | 3/1985 | Nakamura et al. | 251/126 |
| 4,634,434 | 1/1987 | Marino, Jr. et al. | 251/126 |

FOREIGN PATENT DOCUMENTS

| | | | |
|---|---|---|---|
| 0024253 | 2/1980 | Japan | 251/126 |
| 894360 | 4/1962 | United Kingdom | 251/126 |

Primary Examiner—Denise L. Ferensic
Assistant Examiner—John Ball
Attorney, Agent, or Firm—Davis and Bujold

[57] ABSTRACT

An improved control valve to control very low rates of flow having a valve body housing a throttle mechanism. The throttle mechanism comprising a bore and throttle plunger, having a helical exterior groove, sized with an annular passage therebetween. The size of the cylindrical passage is selected and held within limits so that media of a chosen viscosity maintains fully developed laminar conditions as it enters and exits the valve, by keeping the Reynolds Number under 4000. The flow rate is controlled by varying the distance that the throttle plunger extends into the bore. Because the valve operates under constant laminar conditions this varying distance yields linear results between the length of engagement of the throttle plunger in the bore and the flow rate resulting in an increased accuracy control valve.

9 Claims, 3 Drawing Sheets

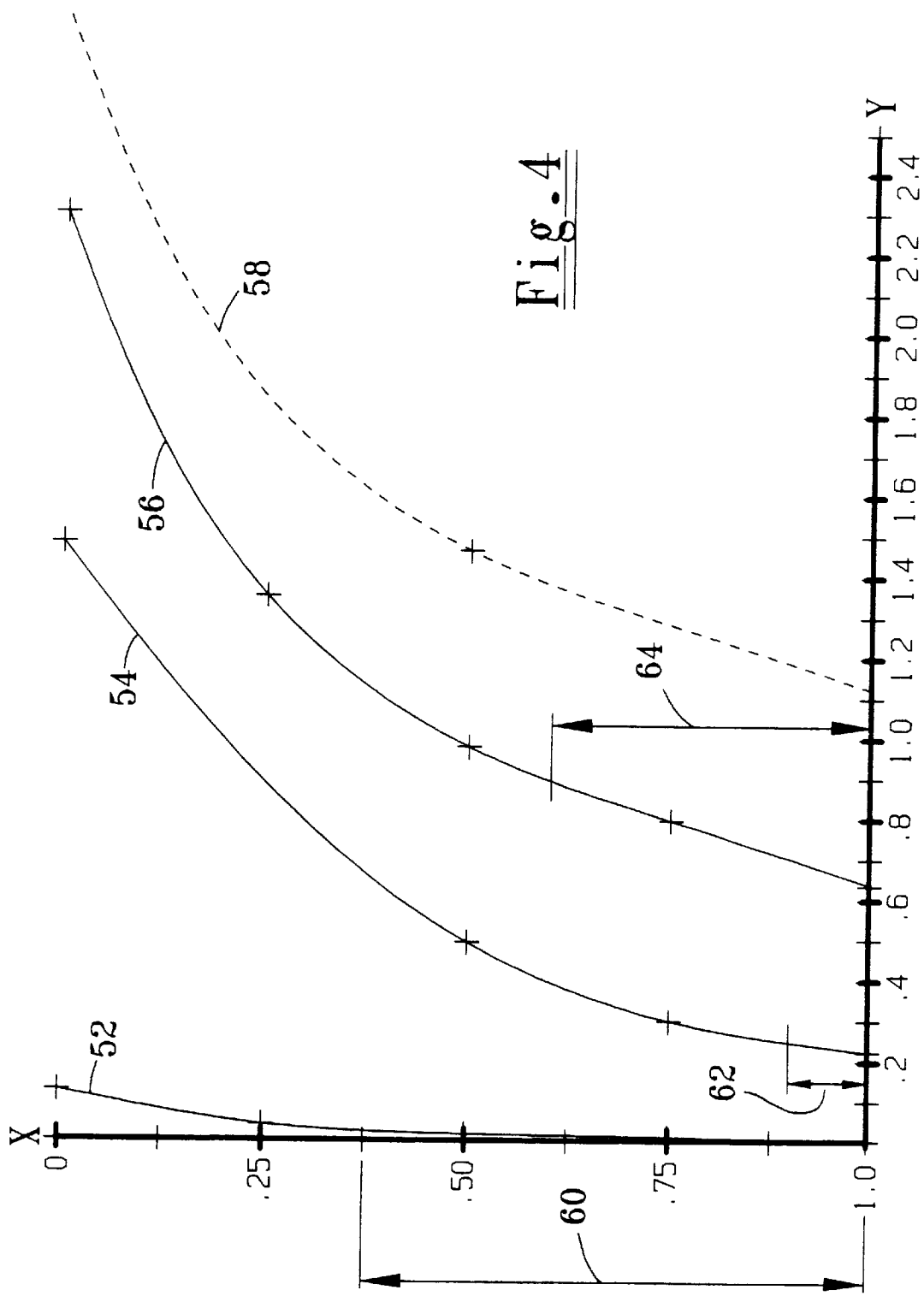

LOW FLOW RATE VALVE

FIELD OF THE INVENTION

The present invention relates generally to a control valve for controlling very low rates of flow and more particularly to a control valve that utilizes a constant predetermined flow passage area to establish and maintain laminar flow through the valve resulting in increased accuracy of the control valve.

BACKGROUND OF THE INVENTION

Control or throttle valves are currently recognized and used to regulate the flow of gas and fluids. Conventional throttle valves function by adjusting a defined flow passage area to create localized high velocities which are subsequently dissipated downstream in aimless, chaotic turbulent flow. During operation the Reynolds Number of the fluid flowing through these valves is outside of the laminar limit and well into the turbulent range. Because of the chaotic flow through the valve, the pressure is at its lowest immediately downstream from the valve but gradually recovers as the flow proceeds. The ultimate extent of this recovery is dependant on the installed environment of the valve, because these environmental factors contribute non-linearly to recovery, the accuracy of conventional control valves is difficult to determine. By creating laminar conditions, undesirable pressure recovery downstream from the valve is prevented thus eliminating non-linear factors and thereby increasing accuracy.

In order to assure fully developed laminar flow within a reasonable length, minimized entrance length of restricted flow path is necessary to fully develop a laminar flow velocity profile. It is beneficial to limit the clearance through which the fluid flows which also limits flow capacity. Increasing the flow area will increase flow capacity but will also extend the entrance length and prevents use of the valve within the lower flow rate regime.

Considering these and other problems, it is an object of the present invention to provide a valve that regulates very low rates of flow.

Another object is to provide an accurate valve that supplies linear characteristics of flow versus plunger position.

Still another object is to provide a valve that constantly maintains laminar conditions so that there is no pressure recovery downstream from the valve resulting in increased accuracy of the valve.

SUMMARY OF THE INVENTION

Generally the present invention provides a control valve used to control very low flow rates of media while constantly maintaining laminar conditions resulting in linear characteristics of flow versus plunger position thereby increasing the accuracy of the device.

According to the invention there is provided a valve for controlling the flow of a fluid media comprising, a valve body means having an inlet port to receive pressurized fluid media and an outlet port for media following flow control by the valve; the valve body means defining a bore; a cylindrical throttle plunger extending coaxially with and into the bore to define therewith an annular passage through which the media flows from the inlet port to the outlet port; and an actuating means to move the throttle plunger axially to control the magnitude of extension of the plunger into the bore to control rate of media flow through the valve.

Also according to the invention there is provided a valve for controlling the flow of a media comprising; a valve body means having an inlet port to receive pressurized fluid media and an outlet port for media following flow control by the valve; the valve body means defining a bore; a cylindrical throttle plunger extending coaxially with and into the bore to define therewith an annular passage through which the media flows from the inlet port to the outlet port; an actuating means to move the throttle plunger axially to control the magnitude of extension of the plunger into the bore to control rate of media flow through the valve; and wherein the throttle plunger defines a cylindrical outer surface having a helical groove of uniform cross-section and pitch therein, the groove being open to the annular passage throughout the axial extension of the plunger into the bore.

Further according to the invention there is provided a method of using a device to control the flow of media comprising the steps; a) receiving a media under pressure; b) feeding the media through an annular passage defined between a cylindrical throttle plunger and a bore, the throttle plunger having a helical groove of uniform depth and pitch located open to the annular passage throughout the annular passage; c) controlling the media flow rate by controlling extension of the throttle plunger into the bore; d) controlling the state of flow by controlling the size of the annular passage to maintain a Reynolds Number of less than 4000 to provide Laminar flow conditions throughout a desired operating flow range of the valve; and e) throttling the media flow by passing the media through the annular passage whereby the media follows an axial streamline flow and encounters an intersecting stream of media following the helical groove path, whereby the helical path flow entrains the axial flow in the vicinity of the helical groove causing the media to be accelerated along a helical path through the ungrooved portion of the cylindrical passage.

BRIEF DESCRIPTION OF THE DRAWINGS

The invention will now be described, by way of example, with reference to the accompanying drawings, in which:

FIG. 4 are performance graphs including the valve of FIGS. 1–3.

DETAILED DESCRIPTION OF THE INVENTION

Figure 1:
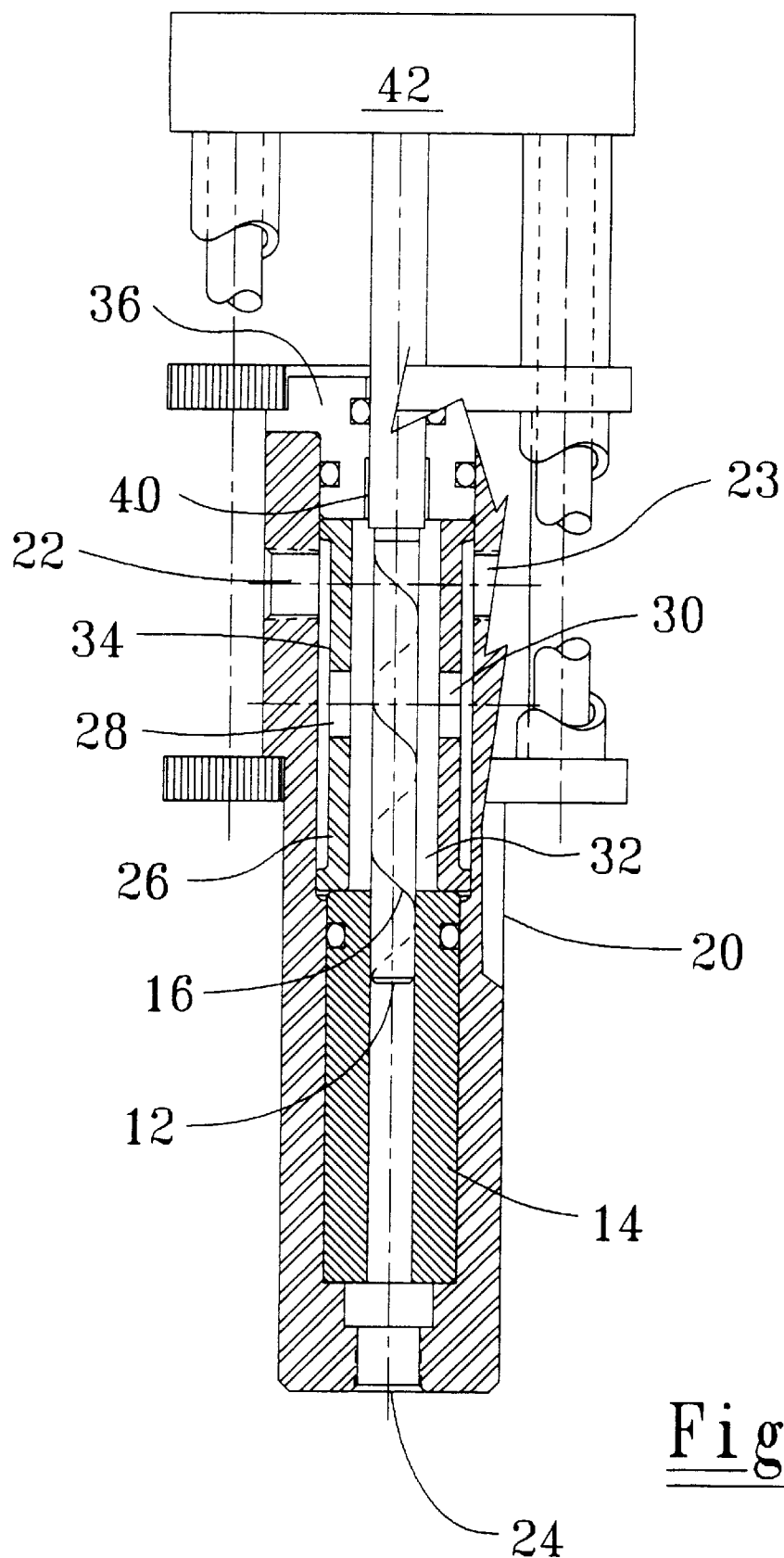
FIG. 1 is an elevation of the control valve of the present invention with the valve body, bushing and spacer depicted cutaway.
Figure 2:
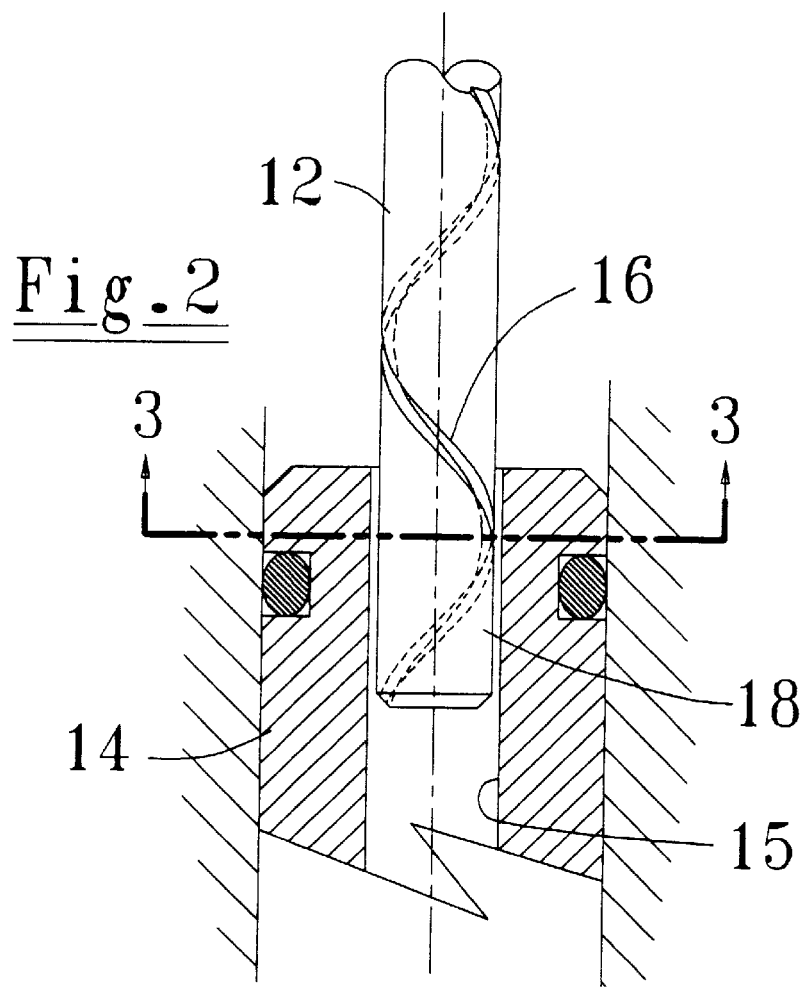
FIG. 2 is an enlarged view of the throttle plunger of the control valve partially engaged in the bushing.
Figure 3:
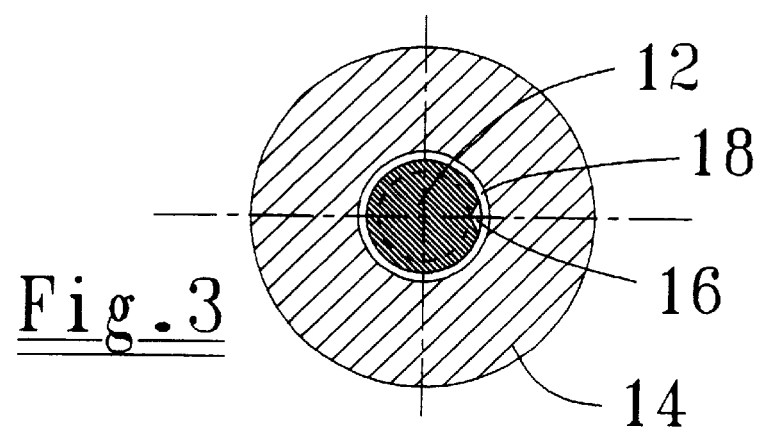
FIG. 3 is cross-sectional view along section line 3—3 of FIG. 2.

An embodiment of the invention as depicted in FIGS. 1–3 of the drawings, consists of a valve body 20 comprising fluid (preferably liquid) media inlet port (22) extending through a wall of the valve body 20 to an annular chamber 34, and a gage port (23) provided as an auxiliary port for installation of a pressure gage or other instrument.

The chamber 34 is located between the valve body 20 and a spacer 26. The media in the chamber 34 passes through chamber ports (28, 30) extending through a wall of the spacer 26 to a valve inlet chamber 32. The inlet chamber 32 is located between the spacer 26 and a throttle plunger 12.

The valve body 20 supports and is sealed to a bushing 14 having a bore 15 with a selected inside diameter. The inside diameter is sized to admit the throttle plunger 12 whose outside diameter is chosen to create an annular passage 18 between the plunger and the bore. The axial length of the throttle plunger 12 is equal to or longer than the axial length of the bushing 14, such that a fully engaged throttle plunger 12 occupies the entire length of the bore 15.

The media under pressure in the inlet chamber 32 passes into the annular passage 18 and flows therealong and also along a helical groove 16 of uniform depth and pitch located on the surface of the throttle plunger 12. After the media passes through the cylindrical passage 18, the media exits from an outlet port 24 in a laminar state.

A cap 36 is situated at and sealed to the inlet end of the valve body 20. The throttle plunger 12 passes through the axial center, on longitudinal axis outlet 24 of the valve, of a cap 36. A clearance 40 is provided to limit the length of fit between the plunger 12 and the cap 36 and a seal 41, shown as an O-ring, is situated between the throttle plunger 12 and the cap 36 so that no fluid may leak from the valve at this location. The throttle plunger 12 is raised and lowered through the cap to adjust the extent of admission of the plunger 12 in the bore 15.

The spacer 26 is open at both ends. One end of the spacer 26 abuts the cap 36 and the other end abuts the bushing 14. The inside diameter of the spacer 26 is larger than the inside diameter of the bore 15, so that the throttle plunger 12 as it extends through spacer 26 does not form a close fit with the spacer 26. The inlet chamber 32 is formed between the throttle plunger 12 and the spacer 26.

Although the throttle plunger 12 includes a helical groove 16 in the preferred embodiment, a throttle plunger 12 without a groove or with a groove of a different form may be provided in accordance with this invention. When the throttle plunger 12 is engaged in the bushing 14, a media flow path is created, when a helical groove 16 is provided, along both the helical groove 16 and the annular passage 18. The media flow path has an axial and a helical component. This fluid flow path is important because the throttle plunger 12 acts in conjunction with the close fitting bushing 14 to impede the free flow of the controlled media. The flow rate can be reduced by extending the throttle plunger 12 further into the bushing 14, or increased by withdrawing it. An actuator 42 comprises a stepper motor-leadscrew arrangement for controlling the axial extension of the plunger into the bore.

Flow takes place through the annular clearance between the plunger 12 and bore 15 as well as along the helical groove 16. The clearance is held within limits necessary (for a fluid of a given viscosity) to keep the Reynolds Number low so as to prevent the onset of turbulent flow with consequent undesirable pressure recovery downstream from the valve. The plunger need not be grooved and initial tests of a prototype were made with plain plungers. The groove 16 or "thread" was added later to increase the flow capacity of the valve while keeping the Reynolds Number within a desirable range (below 4,000 and preferably below 1,500).

In order to assure fully developed laminar flow within a reasonable length (achieved by minimizing the length of restricted flow path necessary to fully develop a laminar flow velocity profile, referred to in fluid dynamics circles as "entrance length") it is beneficial to limit the clearance between the plunger 12 and bore 15, which also limits flow capacity. Increasing the diameter of the bore 15 and plunger 12 increases flow capacity but also extends entrance length and prevents use of the valve within the lower flow rate regime [as compared with a similar valve having the same length and plunger/bore clearance, but a smaller bore].

It has been found that by providing a very shallow, long-lead helical groove 16 of uniform depth in the surface of the plunger the flow capacity is increased significantly without altering the throttling characteristic. When the throttling characteristic of the grooved plunger is compared with that of a plain plunger having twice the clearance it is seen that the entrance length is reduced significantly while the flow rate increases dramatically.

With reference to FIG. 4, actual and theoretical results with a liquid input at a constant pressure and viscosity are depicted to illustrate the effects of increasing the diametrical clearance between the plunger and the bore and the effects of adding a groove to the plunger.

The horizontal axis Y represents the flow rate in gallons per hour and the vertical axis X represents plunger position in inches, where 1.0 on the vertical axis depicts a plunger that is inserted 1 inch into the bore.

All diametrical clearances are between the plunger and the bore. Curves 52 and 54 represent actual test results of flow rate vs. plunger position where the plunger does not have a groove. The diametrical clearance used to generate curve 52 is 0.0005" and the diametrical clearance used to generate curve 54 is 0.001".

Curve 56 represents actual test results of flow rate vs. plunger position where the diametrical clearance is 0.0005" and the plunger has a helical groove as described above. Finally, curve 58 represents theoretical results of flow rate vs. plunger position where the diametrical clearance is 0.001" and the plunger has a similar helical groove.

Operation in the fully developed flow rate range ensures laminar flow. During laminar flow the accuracy of the valve is maximized because of the linear characteristic of flow rate versus plunger position.

Fully developed flow exists in the ranges represented on curves 52, 54, 56 and 58 as 60, 62 and 64 respectively. By increasing the diametrical clearance from 0.0005" to 0.001", the fully developed flow range is greatly reduced (60 to 62) as compared with maintaining a 0.0005" diametrical clearance while adding a helical groove to the plunger by which the range of flow rate control, in the fully developed flow range 64, is increased significantly.

This phenomena is illustrated in FIG. 4. Range 60 represents fully developed flow rate when the diametrical clearance is 0.0005" and the plunger has no groove. Here the flow rate control is minimal within the fully developed flow range. However, when a groove is added to the plunger and the clearance is maintained at 0.0005" as shown on curve 56, fully developed flow exists throughout range 64 resulting in a dramatic increase in flow rate control within this range. A similar comparison can be drawn between the actual test results depicted in curve 54 and the theoretical results depicted in curve 58.

The hypothesis to explain the interaction of axial with 'helical' flow follows. A particle of the fluid media entering the clearance between the plunger and bore and travelling along an axial streamline encounters an intersecting stream of particles following a helical path. The helical flow tends to entrain the axial flow in the vicinity of the groove causing it to be accelerated along a helical path through the ungrooved portion of the plunger/bore clearance. It should be noted that the increase in cross-sectional flow area occasioned by the addition of the groove is far too small to explain the increase in flow rate. For example:

Clearance area, plain plunger 0.250" dia. with 0.0005" diametral clearance=$1.9 \times 10^{-4}$ sq.in.

Cross-sectional area, 0.012" deep helical groove=$1.17 \times 10^{-6}$ sq.in.

Total clearance area, plunger with 0.00005" diametral clearance with 0.012" deep groove:

$$A = 1.9 \times 10^{-4} + 1.17 \times 10^{-6} = 1.917 \times 10^{-4} \text{ sq.in.}$$

Clearance area, plunger with 0.001" diametral clearance $$A = 3.9 \times 10^{-4} \text{ sq.in.}$$

Increase in clearance area by addition of 0.012" deep groove=0.61%

Increase in clearance area by doubling diametral clearance=100%

During operation, a media under pressure that is to have its flow rate controlled, is fed through the inlet port 22 and ports 28, 30 and then through annular clearance 18 and groove 16 to control flow rate before discharge through the outlet port 24.

The valve operates at very low Reynolds Numbers so that the flow through the throttling section is laminar at all times and relies on the viscous drag of the controlled media, rather than on the generation or turbulence, to create pressure drop. Therefore in a given valve, length of engagement of the throttle plunger 12 into the bore 15 is the sole controlling parameter in the fully developed flow range of the valve, thereby resulting in an accurate throttle valve.

What is claimed is:

1. A valve for controlling the flow of a media comprising;

a valve body means having an inlet port to receive pressurized fluid media and an outlet port for media following flow control by the valve;

the valve body means defining a bore;

a cylindrical throttle plunger extending coaxially with and into tile bore such that there is a clearance between the throttle plunger and the valve body means, defining; therewith an annular passage through which the media flows axially from the inlet port to the outlet port;

an actuating means to move the throttle plunger axially to control the magnitude of extension of the plunger into the bore to control rate of media flow through the valve; and wherein the throttle plunger defines a cylindrical outer surface having a helical groove of uniform cross-section and pitch therein, the groove being open to the annular passage throughout the axial extension of the plunger into the bore.

2. A valve according to claim 1, wherein the throttle plunger has a greater length than the bore.

3. A valve according to claim 1, wherein the flow rate of the media is reduced by extending the throttle plunger further into the bore and increased by withdrawing the throttle plunger further out of the bore.

4. A valve according to claim 1, sized whereby the media flow through the annular passage is laminar throughout the range of flows desired for the valve.

5. A valve according to claim 4, wherein laminar conditions are constantly maintained by selecting the size of the annular passage so that the media of a given viscosity is maintained at a Reynolds Number less than 4000.

6. A valve according to claim 5, wherein the Reynolds Number is maintained at less than 1500.

7. A valve account to claim 1, wherein the valve body means comprises:

a valve body generally cylindrical in shape and open at both ends and having the inlet port in a side wall of the valve body and the outlet port at one end of the valve body;

a bushing located in the valve body between the inlet and outlet ports and defining the bore;

a throttle plunger support cap sealingly located in the open end of the valve body remote from the outlet port and through which the throttle plunger extends in sealed manner for axial adjustment; and a spacer generally cylindrical in shape and defining a central opening communicating with the inlet port, the throttle plunger extending through the opening from the cap into the bore.

8. A method of using a device to control the flow of media comprising the steps;

a) receiving a media under pressure;

b) feeding the media through an annular passage defined between a cylindrical throttle plunger and a bore, the throttle plunger having a helical groove of uniform depth and pitch located open to the annular passage throughout the annular passage;

c) controlling the media flow rate by controlling extension of the throttle plunger into the bore;

d) controlling the state of flow by controlling the size of the annular passage to maintain a Reynolds Number of less than 4000 to provide Laminar flow conditions throughout a desired operating flow range of the valve; and e) throttling the media flow by passing the media through the annular passage whereby the media follows an axial streamline flow and encounters an intersecting stream of media following the helical groove path, whereby the helical path flow entrains the axial flow in the vicinity of the helical groove causing the media to be accelerated along a helical path through the ungrooved portion of the cylindrical passage.

9. The method of claim 8, wherein the Reynolds Number is less than 1500.

* * * * *